(12) United States Patent
Ballapalle et al.

(10) Patent No.: US 8,311,354 B2
(45) Date of Patent: Nov. 13, 2012

(54) DCT-BASED TECHNIQUE WITH RHOMBUS SCANNING FOR IMAGE COMPRESSION

(75) Inventors: Prabhakar Ballapalle, Bangalore (IN); Phani U Kumar, Ongole (IN)

(73) Assignee: LSI Corporation, Milpitas, CA (US)

( * ) Notice: Subject to any disclaimer, the term of this patent is extended or adjusted under 35 U.S.C. 154(b) by 786 days.

(21) Appl. No.: 12/428,494

(22) Filed: Apr. 23, 2009

(65) Prior Publication Data

US 2010/0272374 A1  Oct. 28, 2010

(51) Int. Cl.
*G06K 9/36* (2006.01)
(52) U.S. Cl. .... 382/250; 382/166; 382/251; 375/240.16
(58) Field of Classification Search .................. 382/166, 382/232, 250, 251; 375/240.16
See application file for complete search history.

(56) References Cited

U.S. PATENT DOCUMENTS

| | | | | |
|---|---|---|---|---|
| 5,751,865 A | * | 5/1998 | Micco et al. | 382/296 |
| 2006/0209956 A1 | * | 9/2006 | Tsai et al. | 375/240.12 |

FOREIGN PATENT DOCUMENTS

JP  09224247  * 8/1997

* cited by examiner

*Primary Examiner* — Jingge Wu
*Assistant Examiner* — Eueng-Nan Yeh
(74) *Attorney, Agent, or Firm* — Raj Abhyanker, PC (57) ABSTRACT

A DCT-based technique with rhombus scanning for image compression. A flipped-kernel discrete cosine transform is applied to an eight by eight pixel sub-block of the sixteen by sixteen pixel block. A visually insignificant information is removed from the eight by eight pixel sub-block. A quantization method is used to remove the visually insignificant information. A quantized discrete cosine transform coefficient is scanned of the sixteen by sixteen pixel block. The quantized discrete cosine transform coefficient is scanned according to a rhomboid pattern. A portion of a digital image may be divided into a sixteen by sixteen pixel block.

20 Claims, 4 Drawing Sheets

DCT-BASED TECHNIQUE WITH RHOMBUS SCANNING FOR IMAGE COMPRESSION

FIELD OF TECHNOLOGY

This disclosure relates generally to digital signal processing and more particularly to a DCT-based technique with rhombus scanning for image compression.

BACKGROUND

A user may want to store or transmit a digital image. The digital image may include a redundancy of an image data. In order to store or transmit image data in an efficient form, the user may want to reduce the redundancy of the image data. The user may apply an image compression technique to reduce the redundancy of the image data. However, the image compression technique may have a certain compression ratio in coding the image for storage or transmission that retains a specified level of redundant image data. Storage system and data transmission resources may be wasted storing or transmitting the redundant image data.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

Several methods and a system of a DCT-based technique with rhombus scanning for image compression are disclosed.

An exemplary embodiment provides a method of a computer-implemented digital image compression. A flipped-kernel discrete cosine transform is applied to an eight by eight pixel sub-block of the sixteen by sixteen pixel block. A visually insignificant information is removed from the eight by eight pixel sub-block. A quantization method is used to remove the visually insignificant information. A quantized discrete cosine transform coefficient is scanned of the sixteen by sixteen pixel block. The quantized discrete cosine transform coefficient is scanned according to a rhomboid pattern. A portion of a digital image may be divided into a sixteen by sixteen pixel block.

An exemplary embodiment provides a system. The system includes a digital image compressor. A pixel-block formator divides a portion of a digital image. The portion of the digital image is divided into a sixteen by sixteen pixel block. The discrete cosine transform (DCT) module applies a flipped-kernel discrete cosine transform to an eight by eight pixel sub-block of the sixteen by sixteen pixel block. A quantizer removes a visually insignificant information from a spectral coefficient of the eight by eight pixel sub-block. The visually insignificant information is removed with a quantization method. A coefficient scanner scans a quantized discrete cosine transform coefficient of the sixteen by sixteen pixel block. The quantized discrete cosine transform coefficient is scanned according to a rhomboid pattern.

An exemplary embodiment provides a method of digital image compression. An eight by eight pixel sub-block of a sixteen by sixteen pixel block of a digital image is transformed into a sum of cosine functions. The cosine functions are oscillating at different frequencies with a flipped-kernel discrete cosine transform. A range of values of the sum of cosine functions is compressed into a single quantum value with a quantization method. The range of values of the sum of cosine functions is compressed in order to remove a visually insignificant information from the eight by eight pixel sub-block. A quantized discrete cosine transform coefficient of the sixteen by sixteen pixel block is scanned in rhombus method.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying Drawings and from the Detailed Description that follows.

BRIEF DESCRIPTION OF THE VIEWS OF DRAWINGS

Example embodiments are illustrated by way of example and not limitation in the figures of the accompanying drawings, in which like references indicate similar elements and in which.

Other features of the present embodiments will be apparent from the accompanying Drawings and from the Detailed Description that follows.

DETAILED DESCRIPTION

Several methods and a system of a DCT-based technique with rhombus scanning for image compression are disclosed. Although the embodiments have been described with reference to specific example embodiments, it will be evident that various modifications and changes may be made to these embodiments without departing from the broader spirit and scope of the various embodiments.

Figure 1:
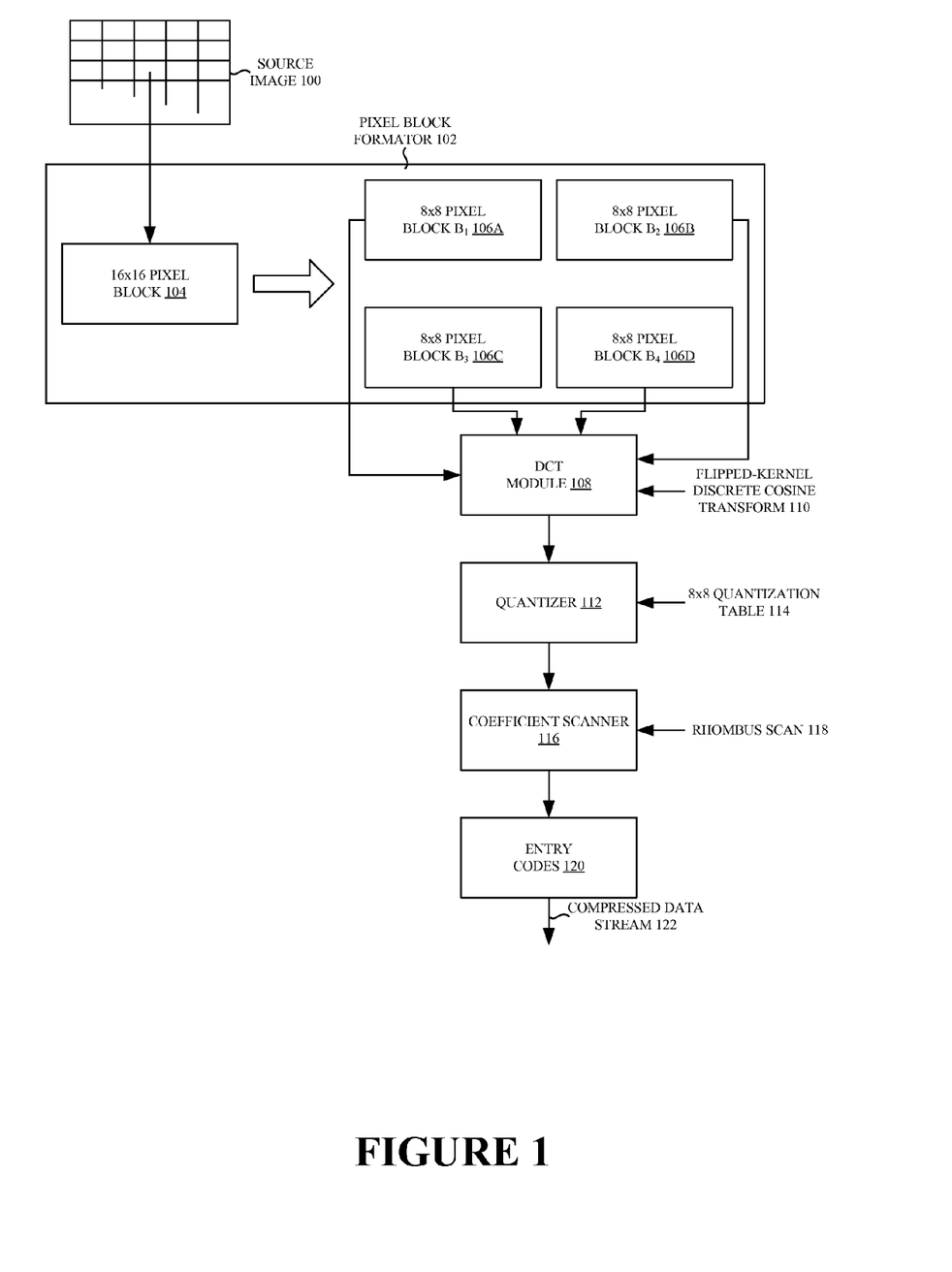
FIG. 1 is a system view of image compression using DCT based technique, according to one embodiment.

FIG. 1 is a system view of image compression using DCT based technique, according to one embodiment. In one embodiment, sixteen by sixteen pixel block 104 is same as 16×16 pixel block 104 and eight by eight pixel block 106A-D is same as 8×8 pixel block $B_1$-$B_4$ 106A-D. Particularly, FIG. 1 illustrates a source image 100, a pixel block formator 102, a 16×16 pixel block 104, an 8×8 pixel block $B_1$-$B_4$ 106A-D, a DCT module 108, a flipped-kernel discrete cosine transform 110, a quantizer 112, an 8×8 quantization table 114, a coefficient scanner 116, a rhombus scan 118, an entropy coder 120 and a compressed data stream 122, according to one embodiment.

In an example embodiment, a portion of the source image 100 is divided into the 16×16 pixel block 104 by the pixel block formator 102. The source image 100 may be an raw input image. The source image 100 may be either a gray-scale image or a color image. The pixel block formator 102 divides the source image 100 into a portion of 16×16 pixel block 104. Further, the flipped-kernel discrete cosine transform 110 may be applied to the 8×8 pixel blocks B1-B4 106A-D. The pixel block formator 102 is communicatively coupled to the DCT module 108.

The DCT module 108 applies a specified two-dimensional DCT to 110 to each of the 8×8 pixel blocks $B_1$-$B_4$ 106A-D. In a particular embodiment, the specified two-dimensional DCT is a flipped-kernel discrete cosine transform 110. The DCT module 108 applies the flipped-kernel discrete cosine transform 110 to each of the 8×8 pixel blocks $B_1$-$B_4$106A-D.

The flipped-kernel discrete cosine transform 110 applied to the 8×8 pixel block $B_1$106A may be:

For sub-block $B_1(N=8)$, $$X_{B_1}(u,v) = \frac{2}{N} C_{B1}(u) C_{B1}(v) \sum_{i=0}^{N-1}\sum_{j=0}^{N-1} I_{B1}(i,j) \cos\left[\frac{(2i+1)[N-(u+1)]\pi}{2N}\right]\cos\left[\frac{(2j+1)[N-(v+1)]\pi}{2N}\right]$$

where $C_{B_1}(u)$ and $C_{B_1}(v)$ are given by, $$C_{B_1}(u), C_{B_1}(v) = \frac{1}{\sqrt{2}}, u = N-1, v = N-1$$

$C_{B_1}(u)$, $C_{B_1}(v)$=1, otherwise, and
where $I_{B_1}(i,j)$ is the (i,j)th element of an image represented by the sub-block B1.

$I_{B1}(i,j)$ represents the pixel intensity values for sub-block B1.

The flipped-kernel discrete cosine transform 110 applied to the 8×8 pixel block $B_2$106B may be:

For sub-block $B_2(N=8)$, $$X_{B_2}(u,v) = \frac{2}{N} C_{B_2}(u) C_{B_2}(v) \sum_{i=0}^{N-1}\sum_{j=0}^{N-1} I_{B_2}(i,j) \cos\left[\frac{(2i+1)[N-(u+1)]\pi}{2N}\right]\cos\left[\frac{(2j+1)v\pi}{2N}\right]$$

where $C_{B_2}(u)$ and $C_{B_2}(v)$ are given by, $$C_{B_2}(u), C_{B_2}(v) = \frac{1}{\sqrt{2}}, u = N-1, v = 0$$

$C_{B_2}(u)$, $C_{B_2}(v)$=1, otherwise, and
where $I_{B_2}(i,j)$ is the (i,j)th element of an image represented by the sub-block B2.

$I_{B2}(i,j)$ represents the pixel intensity values for sub-block B2.

The flipped-kernel discrete cosine transform 110 applied to the 8×8 pixel block $B_3$106C may be:

For sub-block $B_3(N=8)$, $$X_{B_3}(u,v) = \frac{2}{N} C_{B_3}(u) C_{B_3}(v) \sum_{i=0}^{N-1}\sum_{j=0}^{N-1} I_{B_3}(i,j) \cos\left[\frac{(2i+1)u\pi}{2N}\right]\cos\left[\frac{(2j+1)[N-(v+1)]\pi}{2N}\right]$$

where $C_{B_3}(u)$ and $C_{B_3}(v)$ are given by, $$C_{B_3}(u), C_{B_3}(v) = \frac{1}{\sqrt{2}}, u = 0, v = N-1$$

$C_{B_3}(u)$, $C_{B_3}(v)$=1, otherwise, and
where $I_{B_3}(i,j)$ is the (i,j)th element of an image represented by the sub-block B3.

$I_{B3}(i,j)$ represents the pixel intensity values for sub-block B3.

The flipped-kernel discrete cosine transform 110 applied to the 8×8 pixel block $B_4$106D may be:

For sub-block $B_4(N=8)$, $$X_{B_4}(u,v) = \frac{2}{N} C_{B_4}(u) C_{B_4}(v) \sum_{i=0}^{N-1}\sum_{j=0}^{N-1} I_{B_4}(i,j) \cos\left[\frac{(2i+1)u\pi}{2N}\right]\cos\left[\frac{(2j+1)v\pi}{2N}\right]$$

where $C_{B_4}(u)$ and $C_{B_4}(v)$ are given by, $$C_{B_4}(u), C_{B_4}(v) = \frac{1}{\sqrt{2}}, u = 0, v = 0$$

$C_{B_4}(u)$, $C_4(v)$=1, otherwise, and
where $I_{B_4}(i,j)$ is the (i,j)th element of an image represented by the sub-block B4.

$I_{B4}(i,j)$ represents the pixel intensity values for sub-block B4.

A DCT coefficient matrix of a resulting 16×16 block is:

$$X = \begin{bmatrix} X_{B1} & X_{B1} \\ X_{B3} & X_{B4} \end{bmatrix}$$

Figure 2:
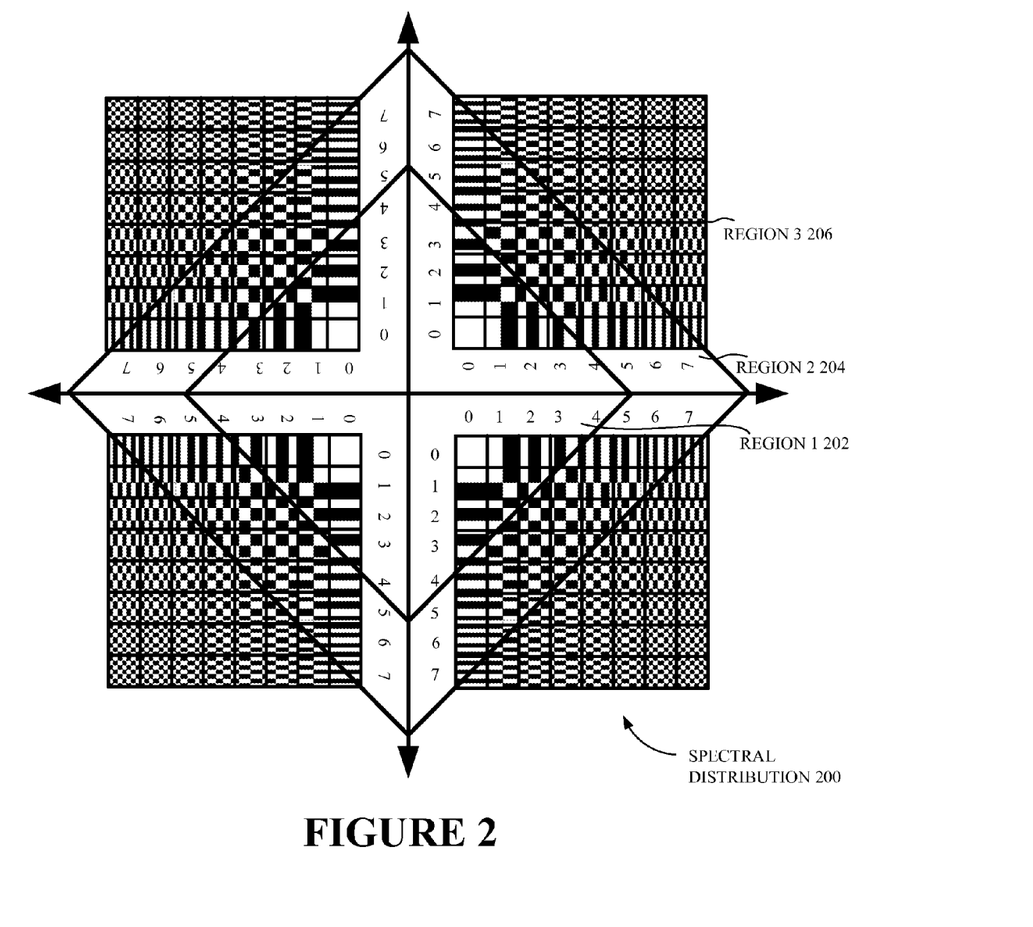
FIG. 2 is a graphical view of a spectral distribution of low-pass, mid-band and high-pass coefficients in a rhombus pattern, according to one embodiment.

A spectral coefficient of the result of the application of the flipped-kernel discrete cosine transform 110 is shown in FIG. 2.

After applying DCT using the DCT module 108, the spectral coefficient of the 8×8 pixel blocks $B_1$-$B_4$106A-D are quantized with the 8×8 quantization table 114. The quantizer 112 removes visually insignificant information from the 8×8 pixel blocks $B_1$-$B_4$106A-D. The quantization process includes dividing each 8×8 pixel blocks $B_1$-$B_4$106A-D component in the frequency domain by a constant. The result of the division of each of the 8×8 pixel blocks $B_1$-$B_4$106A-D component in the frequency domain is rounded by a constant to a nearest value. In a particular example embodiment, the quantization process may be a lossy operation.

The quantization matrices used for the four 8×8 pixel blocks $B_1$-$B_4$106A-D are given below, according to an example embodiment:

The Q matrix includes the general quantization matrix used in the standard image coding:

$$Q = \begin{bmatrix} q_{00} & q_{01} & q_{02} & q_{03} & q_{04} & q_{05} & q_{06} & q_{07} \\ q_{10} & q_{11} & q_{12} & q_{13} & q_{14} & q_{15} & q_{16} & q_{17} \\ q_{20} & q_{21} & q_{22} & q_{23} & q_{24} & q_{25} & q_{26} & q_{27} \\ q_{30} & q_{31} & q_{32} & q_{33} & q_{34} & q_{35} & q_{36} & q_{37} \\ q_{40} & q_{41} & q_{42} & q_{43} & q_{44} & q_{45} & q_{46} & q_{47} \\ q_{50} & q_{51} & q_{52} & q_{53} & q_{54} & q_{55} & q_{56} & q_{57} \\ q_{60} & q_{61} & q_{62} & q_{63} & q_{64} & q_{65} & q_{66} & q_{67} \\ q_{70} & q_{71} & q_{72} & q_{73} & q_{74} & q_{75} & q_{76} & q_{77} \end{bmatrix}$$

The $B_1$ specified quantization matrix of the 8×8 pixel block $B_1$106A includes:

$$Q_{B1} = \begin{bmatrix} q_{77} & q_{76} & q_{75} & q_{74} & q_{73} & q_{72} & q_{71} & q_{70} \\ q_{67} & q_{66} & q_{65} & q_{64} & q_{63} & q_{62} & q_{61} & q_{60} \\ q_{57} & q_{56} & q_{55} & q_{54} & q_{53} & q_{52} & q_{51} & q_{50} \\ q_{47} & q_{46} & q_{45} & q_{44} & q_{43} & q_{42} & q_{41} & q_{40} \\ q_{37} & q_{36} & q_{35} & q_{34} & q_{33} & q_{32} & q_{31} & q_{30} \\ q_{27} & q_{26} & q_{25} & q_{24} & q_{23} & q_{22} & q_{21} & q_{20} \\ q_{17} & q_{16} & q_{15} & q_{14} & q_{13} & q_{12} & q_{11} & q_{10} \\ q_{07} & q_{06} & q_{05} & q_{04} & q_{03} & q_{02} & q_{01} & q_{00} \end{bmatrix}$$

The $B_2$ specified quantization matrix of the 8×8 pixel block $B_2$ 106B includes:

$$Q_{B2} = \begin{bmatrix} q_{70} & q_{71} & q_{72} & q_{73} & q_{74} & q_{75} & q_{76} & q_{77} \\ q_{60} & q_{61} & q_{62} & q_{63} & q_{64} & q_{65} & q_{66} & q_{67} \\ q_{50} & q_{51} & q_{52} & q_{53} & q_{54} & q_{55} & q_{56} & q_{57} \\ q_{40} & q_{41} & q_{42} & q_{43} & q_{44} & q_{45} & q_{46} & q_{47} \\ q_{30} & q_{31} & q_{32} & q_{33} & q_{34} & q_{35} & q_{36} & q_{37} \\ q_{20} & q_{21} & q_{22} & q_{23} & q_{24} & q_{25} & q_{26} & q_{27} \\ q_{10} & q_{11} & q_{12} & q_{13} & q_{14} & q_{15} & q_{16} & q_{17} \\ q_{00} & q_{01} & q_{02} & q_{03} & q_{04} & q_{05} & q_{06} & q_{07} \end{bmatrix}$$

The $B_3$ specified quantization matrix of the 8×8 pixel block $B_3$ 106C includes:

$$Q_{B3} = \begin{bmatrix} q_{07} & q_{06} & q_{05} & q_{04} & q_{03} & q_{02} & q_{01} & q_{00} \\ q_{17} & q_{16} & q_{15} & q_{14} & q_{13} & q_{12} & q_{11} & q_{10} \\ q_{27} & q_{26} & q_{25} & q_{24} & q_{23} & q_{22} & q_{21} & q_{20} \\ q_{37} & q_{36} & q_{35} & q_{34} & q_{33} & q_{32} & q_{31} & q_{30} \\ q_{47} & q_{46} & q_{45} & q_{44} & q_{43} & q_{42} & q_{41} & q_{40} \\ q_{57} & q_{56} & q_{55} & q_{54} & q_{53} & q_{52} & q_{51} & q_{50} \\ q_{67} & q_{66} & q_{65} & q_{64} & q_{63} & q_{62} & q_{61} & q_{60} \\ q_{77} & q_{76} & q_{75} & q_{74} & q_{73} & q_{72} & q_{71} & q_{70} \end{bmatrix}$$

The $B_4$ specified quantization matrix of the 8×8 pixel block $B_4$ 106D includes:

$Q_{B4} = Q$

The coefficient scanner 116 applies a rhombus scan 118 to the DCT coefficients as quantized by the quantizer 112. In an example embodiment, after quantization, the quantized DCT coefficient of the 16×16 pixel block 104 is scanned using a coefficient scanner 116. The scanning is applied in a rhombus fashion. The rhombus scan 118 groups the low-pass to high frequency coefficients of all the four 8×8 pixel blocks $B_1$-$B_4$106A-D as output to the entropy coder 120. The coefficient scanner 116 is coupled to the entropy coder 120.

The entropy coder 120 generates the compressed data stream 122. The entropy coder 120 then processes this data to output the compressed data steam 122. For example, in an example embodiment, the entropy coder 120 may apply a lossless data compression scheme that is independent of the specific characteristics of the medium. For example, the encoding technique may include Huffman coding and/or arithmetic coding, according particular example embodiments. The resulting compressed data stream 122 may be edge in run-length coding of zero magnitude coefficients. The zero magnitude coefficients may lead to higher compression with negligible or almost zero increase in computational complexity.

FIG. 2 is a graphical view of a spectral distribution of low-pass, mid-band and high-pass coefficients in a rhombus pattern, according to another embodiment. Particularly, FIG. 2 illustrates the spectral distribution 200, a region 1 202, a region 2 204, a region 3 206, according to one embodiment.

In an example embodiment, the region 1 202 signifies the low pass region, the region 2 204 signifies the mid-band region and the region 3 206 signifies the high-pass region.

The low pass to high pass distribution of spectral coefficients within each 16×16 pixel block 104 are illustrated in FIG. 2. The low pass distribution of spectral coefficients of an image is more sensitive to the human eye. On the other hand, the high pass distribution of spectral coefficients of an image is less sensitive to the human eye.

Figure 3:
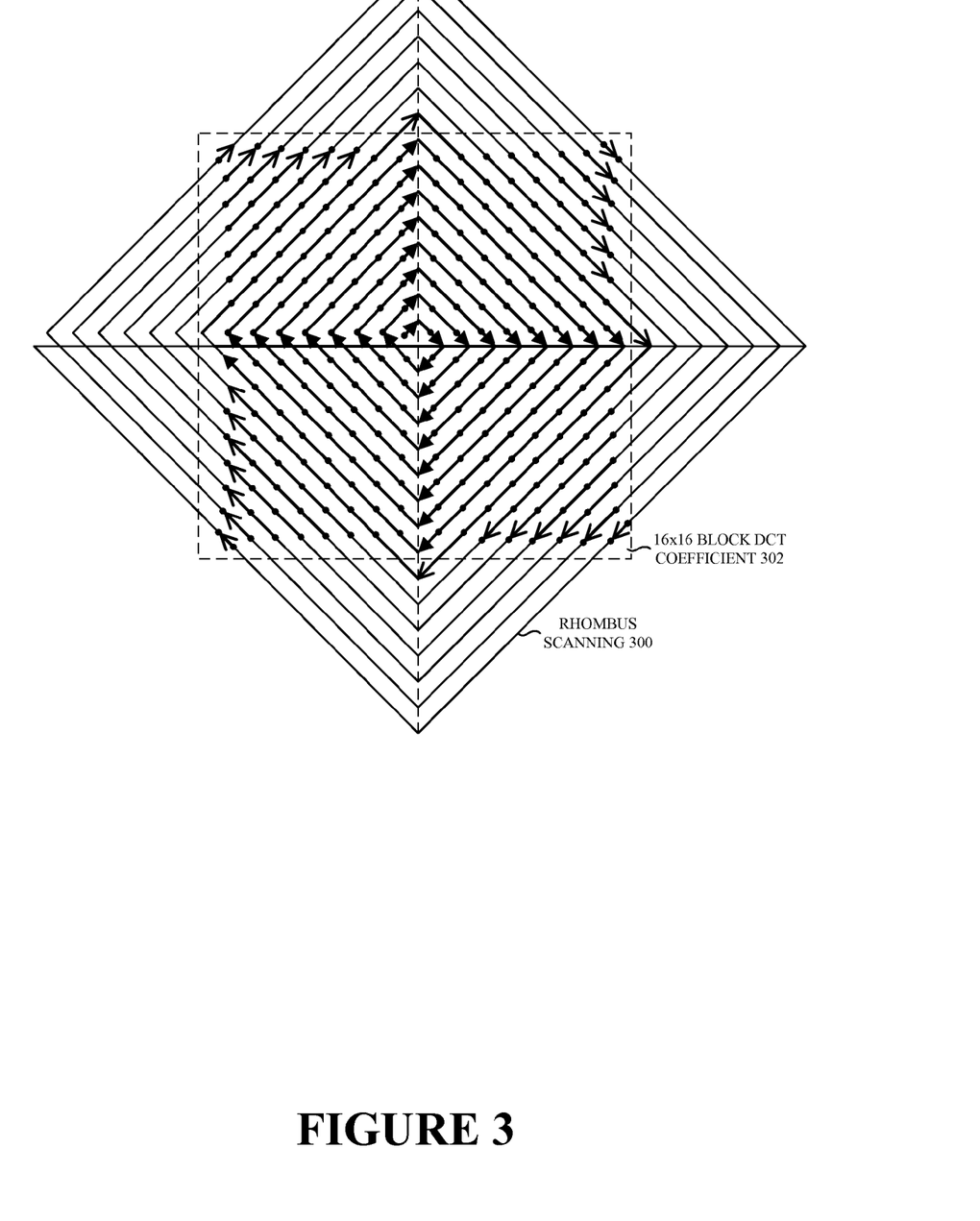
FIG. 3 is a graphical view illustrating rhombus scanning of DCT coefficients, according to one embodiment.

FIG. 3 is a graphical view illustrating rhombus scanning of DCT coefficients, according to one embodiment. Particularly, FIG. 3 illustrates a rhombus scanning 300 and a 16×16 block DCT coefficient 302, according to one embodiment.

In an example embodiment, the 16×16 block DCT coefficients 302 are scanned by rhombus scan 300.

The quantized DCT coefficient of the 16×16 pixel block 104 is scanned with the coefficient scanner 116. The rhombus scan 118 groups the low-pass to high frequency coefficients of the four 8×8 pixel blocks $B_1$-$B_4$106A-D. The rhombus scanning 300 generates a long-run of zeros in the high pass region, after reordering. The high pass region is be the region 3 206. In addition, the high correlation between the different sub-block, AC and DC coefficients may also be exploited for further improvement in compression ratio.

$$D = \begin{bmatrix} 252 & 245 & 234 & 219 & 200 & 177 & 150 & 119 & 120 & 151 & 178 & 201 & 220 & 235 & 246 & 253 \\ 244 & 233 & 218 & 199 & 176 & 149 & 118 & 90 & 91 & 121 & 152 & 179 & 202 & 221 & 236 & 247 \\ 232 & 217 & 198 & 175 & 148 & 117 & 89 & 65 & 66 & 92 & 122 & 153 & 180 & 203 & 222 & 237 \\ 216 & 197 & 174 & 147 & 116 & 88 & 64 & 44 & 45 & 67 & 93 & 123 & 154 & 181 & 204 & 223 \\ 196 & 173 & 146 & 115 & 87 & 63 & 43 & 27 & 28 & 46 & 68 & 94 & 124 & 155 & 182 & 205 \\ 172 & 145 & 114 & 86 & 62 & 42 & 26 & 14 & 15 & 29 & 47 & 69 & 95 & 125 & 156 & 183 \\ 144 & 113 & 85 & 61 & 41 & 25 & 13 & 5 & 6 & 16 & 30 & 48 & 70 & 96 & 126 & 157 \\ 112 & 84 & 60 & 40 & 24 & 12 & 4 & 0 & 1 & 7 & 17 & 31 & 49 & 71 & 97 & 127 \\ 143 & 111 & 83 & 59 & 39 & 23 & 11 & 3 & 2 & 8 & 18 & 32 & 50 & 72 & 98 & 128 \\ 171 & 142 & 110 & 82 & 58 & 38 & 22 & 10 & 9 & 19 & 33 & 51 & 73 & 99 & 129 & 158 \\ 195 & 170 & 141 & 109 & 81 & 57 & 37 & 21 & 20 & 34 & 52 & 74 & 100 & 130 & 159 & 184 \\ 215 & 194 & 169 & 140 & 108 & 80 & 56 & 36 & 35 & 53 & 75 & 101 & 131 & 160 & 185 & 206 \\ 231 & 214 & 193 & 168 & 139 & 107 & 79 & 55 & 54 & 76 & 102 & 132 & 161 & 186 & 207 & 224 \\ 243 & 230 & 213 & 192 & 167 & 138 & 106 & 78 & 77 & 103 & 133 & 162 & 187 & 208 & 225 & 238 \\ 251 & 242 & 229 & 212 & 191 & 166 & 137 & 105 & 104 & 134 & 163 & 188 & 209 & 226 & 239 & 248 \\ 255 & 250 & 241 & 228 & 211 & 190 & 165 & 136 & 135 & 164 & 189 & 210 & 227 & 240 & 249 & 254 \end{bmatrix}.$$

After scanning, the 2-dimensional array of quantized DCT coefficients X may be mapped to a linear array L. The linear array L may be of size 256. The relation between L, D and X may be given by: $L[D(i,j)]=X(i,j)$, for $i=0, \ldots 15$ and $j=0, \ldots 15$.

Figure 4:
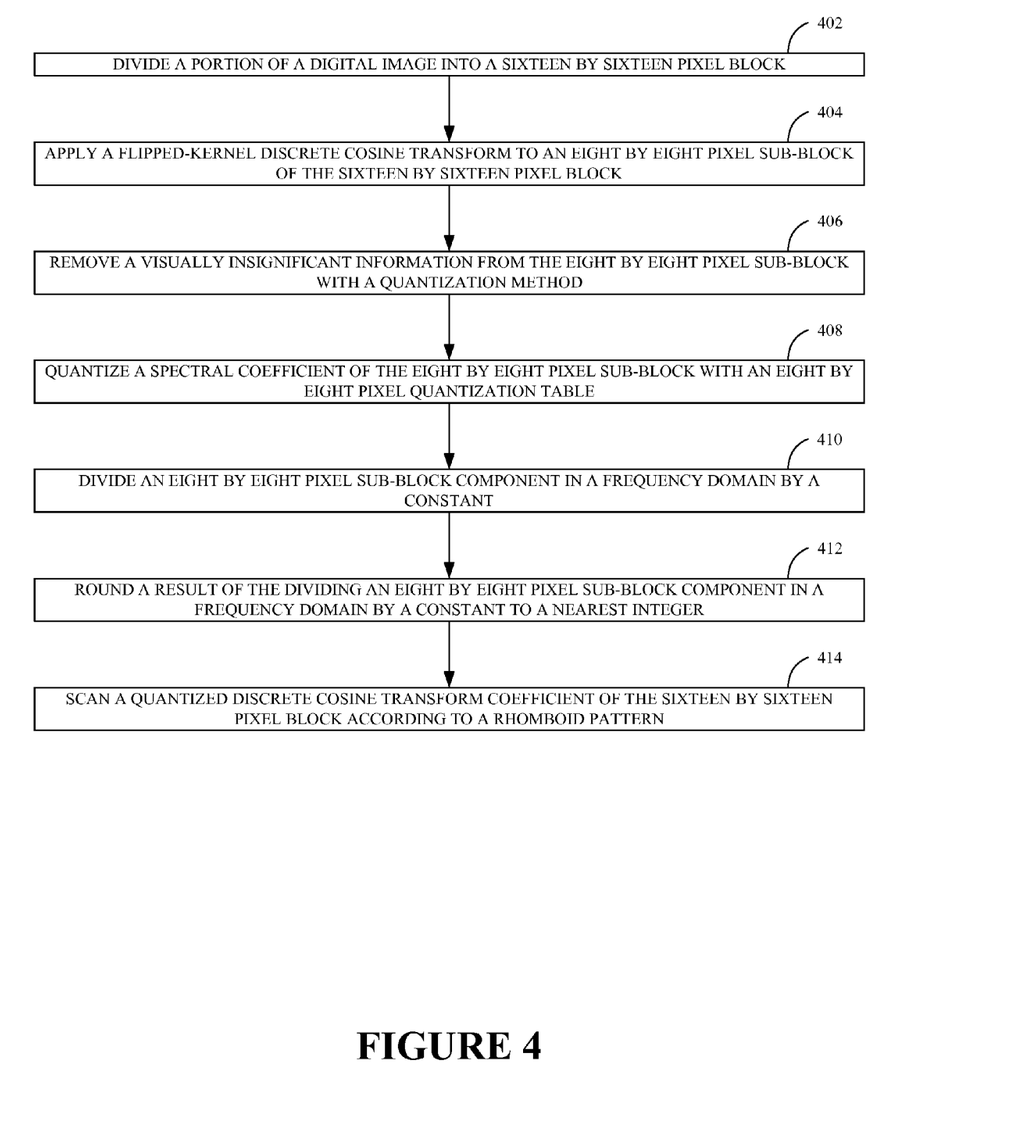
FIG. 4 is a process flow that illustrates dividing a portion of a digital image and then applying a flipped-kernel discrete cosine transform to improve the compression ratio in image coding, according to another embodiment.

FIG. 4 is a process flow that illustrates dividing a portion of a digital image and then applying a flipped-kernel discrete cosine transform to improve the compression ratio in image coding, according to another embodiment. In operation 402, the portion of a digital image may be divided into a sixteen by sixteen pixel block 104. For example, a pixel-block formator 102 may be used to divide the portion of the digital image. For example, the digital image may be the source image 100. In operation 404, the flipped-kernel discrete cosine transform 110 may be applied to an eight by eight pixel sub-block 106A-D of the sixteen by sixteen pixel block 104. For example, a DCT module 108 may be used to apply the flipped-kernel discrete cosine transform 110.

In operation 406, a visually insignificant information may be removed from the eight by eight pixel sub-block 106A-D with a quantization method. For example, the quantizer 112 may remove the visually insignificant information. In operation 408, a spectral coefficient of the eight by eight pixel sub-block 106A-D may be quantized with an eight by eight pixel quantization table 114. In operation 410, the eight by eight pixel sub-block 106A-D component in a frequency domain may be divided by a constant.

In operation 412, a result of the dividing an eight by eight pixel sub-block 106A-D component in a frequency domain may be rounded by a constant to a nearest integer. For example, the quantizer 112 may round the result. In operation 414, a quantized discrete cosine transform coefficient of the sixteen by sixteen pixel block 104 may be scanned according to a rhomboid pattern. For example, the coefficient scanner 116 may scan the discrete cosine transform coefficient.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry, firmware, software or any combination of hardware, firmware, or software embodied in a machine readable medium. For example, the various electrical structure and methods may be embodied using transistors, logic gates, application specific integrated (ASIC) circuitry or Digital Signal Processor (DSP) circuitry.

In addition, it will be appreciated that the various operations, processes, and methods disclosed herein may be embodied in a machine-readable medium or a machine accessible medium compatible with a data processing system, and may be performed in any order. Accordingly, the Specification and Drawings are to be regarded in an illustrative rather than a restrictive sense.

What is claimed is:

1. A computer-implemented method of digital image compression comprising:
    applying a flipped-kernel discrete cosine transform to an eight by eight pixel sub-block of a sixteen by sixteen pixel block;
    removing a visually insignificant information from the eight by eight pixel sub-block with a quantization method; and
    scanning a quantized discrete cosine transform coefficient of the sixteen by sixteen pixel block according to a rhomboid pattern.

2. The method of claim 1, further comprising:
    dividing a portion of a digital image into the sixteen by sixteen pixel block.

3. The method of claim 2, wherein the digital image comprises at least one of a gray-scale image and a color-image.

4. The method of claim 1, further comprising:
    quantizing a spectral coefficient of the eight by eight pixel sub-block with an eight by eight pixel quantization table.

5. The method of claim 1, wherein removing the visually insignificant information from the eight by eight pixel sub-block with the quantization method further comprises:
    dividing an eight by eight pixel sub-block component in a frequency domain by a constant; and
    rounding a result of the dividing of the eight by eight pixel sub-block component in the frequency domain by the constant to a nearest integer.

6. The method of claim 1,
    wherein the sixteen by sixteen pixel block comprises a set of four eight by eight pixel blocks,
    wherein the set of four eight by eight pixel blocks comprise: an eight by eight pixel block B1, an eight by eight pixel block B2, an eight by eight pixel block B3, and an eight by eight pixel block B4,
    wherein the eight by eight pixel block B1 comprises a first eight by eight pixel sub-block of the sixteen by sixteen pixel block,
    wherein the eight by eight pixel block B2 comprises a second eight by eight pixel sub-block of the sixteen by sixteen pixel block,
    wherein the eight by eight pixel block B3 comprises a third eight by eight pixel sub-block of the sixteen by sixteen pixel block, and
    wherein the eight by eight pixel block B4 comprises a fourth eight by eight pixel sub-block of the sixteen by sixteen pixel block.

7. The method of claim 6,
    wherein a general quantization matrix comprises a variable Q,
    wherein Q comprises:

$$Q = \begin{bmatrix} q_{00} & q_{01} & q_{02} & q_{03} & q_{04} & q_{05} & q_{06} & q_{07} \\ q_{10} & q_{11} & q_{12} & q_{13} & q_{14} & q_{15} & q_{16} & q_{17} \\ q_{20} & q_{21} & q_{22} & q_{23} & q_{24} & q_{25} & q_{26} & q_{27} \\ q_{30} & q_{31} & q_{32} & q_{33} & q_{34} & q_{35} & q_{36} & q_{37} \\ q_{40} & q_{41} & q_{42} & q_{43} & q_{44} & q_{45} & q_{46} & q_{47} \\ q_{50} & q_{51} & q_{52} & q_{53} & q_{54} & q_{55} & q_{56} & q_{57} \\ q_{60} & q_{61} & q_{62} & q_{63} & q_{64} & q_{65} & q_{66} & q_{67} \\ q_{70} & q_{71} & q_{72} & q_{73} & q_{74} & q_{75} & q_{76} & q_{77} \end{bmatrix}$$

wherein a specified quantization matrix of the eight by eight pixel block B1 comprises:

$$Q_{B1} = \begin{bmatrix} q_{77} & q_{76} & q_{75} & q_{74} & q_{73} & q_{72} & q_{71} & q_{70} \\ q_{67} & q_{66} & q_{65} & q_{64} & q_{63} & q_{62} & q_{61} & q_{60} \\ q_{57} & q_{56} & q_{55} & q_{54} & q_{53} & q_{52} & q_{51} & q_{50} \\ q_{47} & q_{46} & q_{45} & q_{44} & q_{43} & q_{42} & q_{41} & q_{40} \\ q_{37} & q_{36} & q_{35} & q_{34} & q_{33} & q_{32} & q_{31} & q_{30} \\ q_{27} & q_{26} & q_{25} & q_{24} & q_{23} & q_{22} & q_{21} & q_{20} \\ q_{17} & q_{16} & q_{15} & q_{14} & q_{13} & q_{12} & q_{11} & q_{10} \\ q_{07} & q_{06} & q_{05} & q_{04} & q_{03} & q_{02} & q_{01} & q_{00} \end{bmatrix}$$

wherein a specified quantization matrix of the eight by eight pixel block B2 comprises:

$$Q_{B2} = \begin{bmatrix} q_{70} & q_{71} & q_{72} & q_{73} & q_{74} & q_{75} & q_{76} & q_{77} \\ q_{60} & q_{61} & q_{62} & q_{63} & q_{64} & q_{65} & q_{66} & q_{67} \\ q_{50} & q_{51} & q_{52} & q_{53} & q_{54} & q_{55} & q_{56} & q_{57} \\ q_{40} & q_{41} & q_{42} & q_{43} & q_{44} & q_{45} & q_{46} & q_{47} \\ q_{30} & q_{31} & q_{32} & q_{33} & q_{34} & q_{35} & q_{36} & q_{37} \\ q_{20} & q_{21} & q_{22} & q_{23} & q_{24} & q_{25} & q_{26} & q_{27} \\ q_{10} & q_{11} & q_{12} & q_{13} & q_{14} & q_{15} & q_{16} & q_{17} \\ q_{00} & q_{01} & q_{02} & q_{03} & q_{04} & q_{05} & q_{06} & q_{07} \end{bmatrix}$$

wherein a specified quantization matrix of the eight by eight pixel block B3 comprises:

$$Q_{B3} = \begin{bmatrix} q_{07} & q_{06} & q_{05} & q_{04} & q_{03} & q_{02} & q_{01} & q_{00} \\ q_{17} & q_{16} & q_{15} & q_{14} & q_{13} & q_{12} & q_{11} & q_{10} \\ q_{27} & q_{26} & q_{25} & q_{24} & q_{23} & q_{22} & q_{21} & q_{20} \\ q_{37} & q_{36} & q_{35} & q_{34} & q_{33} & q_{32} & q_{31} & q_{30} \\ q_{47} & q_{46} & q_{45} & q_{44} & q_{43} & q_{42} & q_{41} & q_{40} \\ q_{57} & q_{56} & q_{55} & q_{54} & q_{53} & q_{52} & q_{51} & q_{50} \\ q_{67} & q_{66} & q_{65} & q_{64} & q_{63} & q_{62} & q_{61} & q_{60} \\ q_{77} & q_{76} & q_{75} & q_{74} & q_{73} & q_{72} & q_{71} & q_{70} \end{bmatrix} \text{ and,}$$

wherein a specified quantization matrix of the of the eight by eight pixel block B4 comprises:

QB4=Q.

8. The method of claim 6, wherein the flipped kernel discrete cosine transform applied to B1 comprises:
for sub-block $B_1(N=8)$, $$X_{B_1}(u, v) = \frac{2}{N} C_{B_1}(u) C_{B_1}(v) \sum_{i=0}^{N-1} \sum_{j=0}^{N-1} I_{B_1}(i, j) \cos\left[\frac{(2i+1)[N-(u+1)]\pi}{2N}\right] \cos\left[\frac{(2j+1)[N-(v+1)]\pi}{2N}\right]$$

where $C_{B_1}(u)$ and $C_{B_1}(v)$ are given by, $$C_{B_1}(u), C_{B_1}(v) = \frac{1}{\sqrt{2}}, u = N-1, v = N-1$$

$C_{B_1}(u)$, $C_{B_1}(v)=1$, otherwise, and
where $I_{B_1}(i, j)$ is the (i,j)th element of an image represented by the sub-block B1, wherein the flipped kernel discrete cosine transform applied to B2 comprises:
for sub-block $B_2(N=8)$, $$X_{B_2}(u, v) = \frac{2}{N} C_{B_2}(u) C_{B_2}(v) \sum_{i=0}^{N-1} \sum_{j=0}^{N-1} I_{B_2}(i, j) \cos\left[\frac{(2i+1)[N-(u+1)]\pi}{2N}\right] \cos\left[\frac{(2j+1)v\pi}{2N}\right]$$

where $C_{B_2}(u)$ and $C_{B_2}(v)$ are given by, $$C_{B_2}(u), C_{B_2}(v) = \frac{1}{\sqrt{2}}, u = N-1, v = 0$$

$C_{B_2}(u)$, $C_{B_2}(v)=1$, otherwise, and
where $I_{B_2}(i, j)$ is the (i,j)th element of an image represented by the sub-block B2, wherein the flipped kernel discrete cosine transform applied to B3 comprises:
for sub-block $B_3(N=8)$, $$X_{B_3}(u, v) = \frac{2}{N} C_{B_3}(u) C_{B_3}(v) \sum_{i=0}^{N-1} \sum_{j=0}^{N-1} I_{B_3}(i, j) \cos\left[\frac{(2i+1)u\pi}{2N}\right] \cos\left[\frac{(2j+1)[N-(v+1)]\pi}{2N}\right]$$

where $C_{B_3}(u)$ and $C_{B_3}(v)$ are given by, $$C_{B_3}(u), C_{B_3}(v) = \frac{1}{\sqrt{2}}, u = 0, v = N-1$$

$C_{B_3}(u)$, $C_{B_3}(v)=1$, otherwise, and
where $I_{B_3}(i, j)$ is the (i,j)th element of an image represented by the sub-block B3, and wherein the flipped kernel discrete cosine transform applied to B4 comprises:
for sub-block $B_4(N=8)$, $$X_{B_4}(u, v) = \frac{2}{N} C_{B_4}(u) C_{B_4}(v) \sum_{i=0}^{N-1} \sum_{j=0}^{N-1} I_{B_4}(i, j) \cos\left[\frac{(2i+1)u\pi}{2N}\right] \cos\left[\frac{(2j+1)v\pi}{2N}\right]$$

where $C_{B_4}(u)$ and $C_{B_4}(v)$ are given by, $$C_{B_4}(u), C_{B_4}(v) = \frac{1}{\sqrt{2}}, u = 0, v = 0$$

$C_{B_4}(u)$, $C_{B_4}(V)=1$, otherwise, and
where $I_{B_4}(i, j)$ is the (i,j)th element of an image represented by the sub-block B4.

9. The method of claim 8, wherein the discrete cosine transform coefficient matrix for the sixteen by sixteen block comprises:

$$X = \begin{bmatrix} X_{B1} & X_{B2} \\ X_{B3} & X_{B4} \end{bmatrix}.$$

10. The method of claim 1, wherein scanning the quantized discrete cosine transform coefficient of the sixteen by sixteen pixel block according to the rhomboid pattern further comprises:
performing a rhomboid scan with the quantized discrete cosine transform coefficient of the sixteen by sixteen pixel block.

11. The method of claim 10, further comprising:
grouping a low-pass eight by eight pixel sub-block with a high-frequency coefficient of the eight by eight pixel sub-block.

12. The method of claim 10 further comprising:
mapping the quantized discrete cosine transform coefficient to a linear array.

13. The method of claim 12,
wherein the quantized discrete cosine transform coefficient is represented by a variable X,
wherein the linear array comprises two hundred and fifty-six terms and is represented by a variable L, and
wherein the rhombus scanning comprises a matrix-form D.

14. The method of claim 13, wherein the matrix-form D comprises:

$$D = \begin{bmatrix} 252 & 245 & 234 & 219 & 200 & 177 & 150 & 119 & 120 & 151 & 178 & 201 & 220 & 235 & 246 & 253 \\ 244 & 233 & 218 & 199 & 176 & 149 & 118 & 90 & 91 & 121 & 152 & 179 & 202 & 221 & 236 & 247 \\ 232 & 217 & 198 & 175 & 148 & 117 & 89 & 65 & 66 & 92 & 122 & 153 & 180 & 203 & 222 & 237 \\ 216 & 197 & 174 & 147 & 116 & 88 & 64 & 44 & 45 & 67 & 93 & 123 & 154 & 181 & 204 & 223 \\ 196 & 173 & 146 & 115 & 87 & 63 & 43 & 27 & 28 & 46 & 68 & 94 & 124 & 155 & 182 & 205 \\ 172 & 145 & 114 & 86 & 62 & 42 & 26 & 14 & 15 & 29 & 47 & 69 & 95 & 125 & 156 & 183 \\ 144 & 113 & 85 & 61 & 41 & 25 & 13 & 5 & 6 & 16 & 30 & 48 & 70 & 96 & 126 & 157 \\ 112 & 84 & 60 & 40 & 24 & 12 & 4 & 0 & 1 & 7 & 17 & 31 & 49 & 71 & 97 & 127 \\ 143 & 111 & 83 & 59 & 39 & 23 & 11 & 3 & 2 & 8 & 18 & 32 & 50 & 72 & 98 & 128 \\ 171 & 142 & 110 & 82 & 58 & 38 & 22 & 10 & 9 & 19 & 33 & 51 & 73 & 99 & 129 & 158 \\ 195 & 170 & 141 & 109 & 81 & 57 & 37 & 21 & 20 & 34 & 52 & 74 & 100 & 130 & 159 & 184 \\ 215 & 194 & 169 & 140 & 108 & 80 & 56 & 36 & 35 & 53 & 75 & 101 & 131 & 160 & 185 & 206 \\ 231 & 214 & 193 & 168 & 139 & 107 & 79 & 55 & 54 & 76 & 102 & 132 & 161 & 186 & 207 & 224 \\ 243 & 230 & 213 & 192 & 167 & 138 & 106 & 78 & 77 & 103 & 133 & 162 & 187 & 208 & 225 & 238 \\ 251 & 242 & 229 & 212 & 191 & 166 & 137 & 105 & 104 & 134 & 163 & 188 & 209 & 226 & 239 & 248 \\ 255 & 250 & 241 & 228 & 211 & 190 & 165 & 136 & 135 & 164 & 189 & 210 & 227 & 240 & 249 & 254 \end{bmatrix}.$$

15. The method of claim 1, wherein a machine is caused to perform the method of claim 1 when a set of instructions embodied in a non-transitory machine-readable medium is executed by the machine.

16. A non-transitory machine-readable medium including instructions embodied therein configured to execute on a computing system, comprising:
  instructions for dividing a portion of a digital image into a sixteen by sixteen pixel block;
  instructions for applying a flipped-kernel discrete cosine transform to an eight by eight pixel sub-block of the sixteen by sixteen pixel block;
  instructions for removing a visually insignificant information from a spectral coefficient of the eight by eight pixel sub-block with a quantization method; and
  instructions for scanning a quantized discrete cosine transform coefficient of the sixteen by sixteen pixel block according to a rhomboid pattern.

17. The machine-readable medium of claim 16, comprising instructions for processing the sixteen by sixteen pixel block of the digital image in a left-to-right direction and a top-to-bottom direction, and comprising instructions for quantizing a spectral coefficient of the eight by eight pixel sub-block with an eight by eight pixel quantization table.

18. The machine-readable medium of claim 17, comprising instructions for processing the sixteen by sixteen pixel block in a left-to-right fashion and a top-to-bottom fashion.

19. A method of digital image compression comprising:
  transforming an eight by eight pixel sub-block of a sixteen by sixteen pixel block of a digital image into a sum of cosine functions oscillating at different frequencies with a flipped-kernel discrete cosine transform;
  compressing a range of values of the sum of cosine functions into a single quantum value with a quantization method in order to remove a visually insignificant information from the eight by eight pixel sub-block; and
  rhombus scanning a quantized discrete cosine transform coefficient of the sixteen by sixteen pixel block.

20. The method of claim 19, further comprising:
  placing a low-pass coefficient of an eight by eight sub-block before a high-pass coefficient of the eight by eight sub-block to facilitate an entropy coder.

* * * * *